(12) United States Patent
Mattes et al.

(10) Patent No.: US 7,089,775 B2
(45) Date of Patent: Aug. 15, 2006

(54) DEVICE AND METHOD FOR CALIBRATING A SENSOR

(75) Inventors: Bernhard Mattes, Sachsenheim (DE); Ulrike Groeger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/475,074

(22) PCT Filed: Mar. 19, 2002

(86) PCT No.: PCT/DE02/00983

§ 371 (c)(1),
(2), (4) Date: Apr. 7, 2004

(87) PCT Pub. No.: WO02/086434

PCT Pub. Date: Oct. 31, 2002

(65) Prior Publication Data

US 2004/0154375 A1 Aug. 12, 2004

(30) Foreign Application Priority Data

Apr. 21, 2001 (DE) ................................. 101 19 600

(51) Int. Cl.
*G01L 25/00* (2006.01)

(52) U.S. Cl. .......................................... 73/1.08; 73/1.15

(58) Field of Classification Search ............... 73/1.08, 73/1.15, 1.88, 862.391, 862.392, 862.393; 280/801.1, 806

See application file for complete search history.

(56) References Cited

U.S. PATENT DOCUMENTS

| | | | | |
|---|---|---|---|---|
| 4,473,242 A * | 9/1984 | Weman | .................... | 280/801.1 |
| 5,377,128 A * | 12/1994 | McBean | ...................... | 702/91 |
| 5,906,393 A | 5/1999 | Mazur et al. | | |
| 6,211,793 B1 * | 4/2001 | Smithson | .................... | 340/665 |
| 6,382,667 B1 * | 5/2002 | Aoki | ......................... | 280/735 |

FOREIGN PATENT DOCUMENTS

| | | |
|---|---|---|
| DE | 299 18 199 | 3/2000 |
| DE | 199 40 161 | 3/2001 |
| EP | 0 302 385 | 2/1989 |
| EP | 0 406 735 | 1/1991 |
| EP | 0 997 358 | 5/2000 |
| GB | 2342720 A * | 4/2000 |
| JP | 59 164248 | 9/1984 |
| WO | WO 98 25112 | 6/1998 |
| WO | WO 02 14101 | 2/2002 |

* cited by examiner

*Primary Examiner*—Charles Garber
(74) *Attorney, Agent, or Firm*—Kenyon & Kenyon LLP

(57) ABSTRACT

A device and a method for calibrating a sensor, e.g., a force sensor such as a belt-force sensor, which allow reliable calibration of the sensor in a simple manner to counteract age-related distortion of measured values. The device for calibrating a sensor includes an arrangement for detecting at least one defined state of the sensor. When the sensor is in a defined state thusly detected, a corresponding adjustment of the measured value of the sensor may be implemented within the framework of the method.

5 Claims, 1 Drawing Sheet

DEVICE AND METHOD FOR CALIBRATING A SENSOR

FIELD OF THE INVENTION

The present invention is directed to a device and a method for calibrating a sensor, for example, a force sensor such as a belt-force sensor.

BACKGROUND INFORMATION

The present invention is described in the following on the basis of a plurality of sensors from the automotive sector. However, it is not restricted to these sensors, but may also be realized in connection with sensors from other fields of application.

The triggering of a restraining apparatus in a motor vehicle usually occurs as a function of various parameters such as the severity of the impact and the position and the weight of the passengers. It is useful to take the respective belt force into consideration as well, which is explained in greater detail in the following on the basis of an example.

For the triggering of a multi-stage airbag and for the triggering of belt tighteners, data may be acquired regarding the profile of the individual passengers, which allows conclusions as to their weight. For this purpose, a force sensor, or a force-sensor array, may be used, which is installed in the seat and realized, for example, in the form of a sensor mat having pressure-sensitive sensor cells. The sensor cells are arranged in a matrix and may be triggered individually, so that it is possible to detect the pressure distribution in the seat in the form of a value matrix. The heavier a person, the more heavily the seat material is compressed and the higher the number of activated sensor cells. Of course, the pressure value detected by a sensor cell is also dependent on the respective pressurization. In evaluating the pressure data detected by the individual sensor cells of the sensor mat, the number of the activated sensor cells is therefore taken into consideration as well, in addition to the individual pressure values. A control device, which is also installed in the seat, carries out the evaluation. The result of the evaluation is transmitted to the air bag control device, so that the individual seat occupancy may be taken into consideration in the triggering of the restraining means. This method is largely independent of external conditions such as cold or wear. Nevertheless, the force-sensor array should be calibrated at regular time intervals in order to ensure constant measuring results at a given weight force.

A child seat may be detected on the basis of its seat profile, which does not resemble that of a person. However, if a child seat is strapped in with a strong belt force of approximately 150 N, it is pressed into the seat with such force that its seat profile is distorted and it appears heavier than it actually is.

However, a belt force of more than 30 N may not really be applied over a long period of time when a person is strapped in since the belt usually yields. Such a high belt force may also be so uncomfortable that no passenger would maintain it. Therefore, when the belt force exceeds a certain threshold value it may be assumed with a high degree of certainty that it is not a person that is strapped in but a child seat or some other object. On the basis of the data of the applied belt force, it thus may be possible to implement an occupancy detection to a certain extent.

A prerequisite for being able to consider the force exerted by the belt when evaluating the pressure data is the use of a belt-force sensor. However, for this purpose it may be necessary to ensure that a measuring value of the belt-force sensor is constant in the long term or over the service life of the motor vehicle at a given belt force. This may be problematic in practice, in particular, in static belt-force sensors, since it is often the case here that time drift occurs in the measured values.

SUMMARY OF THE INVENTION

In order to counteract age-related distortion of the measured values, according to the present invention, a device and a method for calibrating a sensor, e.g., a force sensor such as a belt-force sensor, may allow reliable calibration of the sensor in a simple manner.

To this end, the device according to the present invention detects at least one defined state of the sensor. Within the framework of the method according to the present invention, a correction of the measured value of the sensor may be implemented when the sensor is in a defined state, that is, the measured value of the sensor corresponding to this state is known.

The device and the method according to the present invention may be used regardless of the technical design of the sensor.

For instance, according to an exemplary embodiment of the present invention, a dynamically sensing acceleration sensor or a low-g acceleration sensor having high resolution, which is used to measure the acceleration of a vehicle, may be calibrated to the zero-acceleration value when the vehicle is at a standstill. This state may be detected in a simple manner by the wheel speed zero and/or the turned off engine.

According to another exemplary embodiment of the present invention, the calibration of a yaw-rate sensor may be accomplished. By calculating the angular motion of the vehicle on the basis of two GPS satellite navigation signals emitted by two different transmitters, a nominal state of the yaw-rate sensor is able to be determined.

An exemplary embodiment of the present invention also makes it easy to calibrate a voltage meter as it is used, for example, to measure the electrical system voltage of a motor vehicle or in the measuring of the resistance of a fuel-level measuring device, by using a bandgap-voltage source as reference. These reference sources are accurate and are well suited for integration in an ASIC.

In another exemplary embodiment of the present invention, the measured value is adjusted in a force sensor in the unloaded state of the force sensor, since this state may be reliably detected in a relatively easy manner.

If the force sensor is used to detect the weight of a vehicle occupant, the unloaded state may be determined simply on the basis of seat occupancy. If the seat is not occupied, the corresponding force sensor is in an unloaded state. The seat occupancy may be detected with the aid of a passenger compartment camera in an uncomplicated manner.

If the force sensor is a belt-force sensor, the unloaded state may be recognized via the belt-buckle state, since an operative belt-force sensor may be in an unloaded state when the belt buckle is open. The belt-buckle state may be monitored, for instance, with the aid of a belt-buckle contact integrated in the belt buckle. Thus, the calibration procedure may be initiated by an appropriate signal of the belt-buckle contact.

The calibration of a sensor as proposed by the present invention may be repeated at frequent time intervals in order to ensure reliable measuring results in the long term. Only then will it be possible to utilize the data acquired by a force sensor for detecting the weight of a vehicle occupant and by a belt-force sensor for an adaptive triggering of the corresponding restraining means.

BRIEF DESCRIPTION OF THE DRAWING

The FIGURE illustrates an example embodiment of an arrangement of a belt-force sensor, which includes a device according to an example embodiment of the present invention for calibration of a sensor in a motor vehicle.

DETAILED DESCRIPTION

Figure 1:
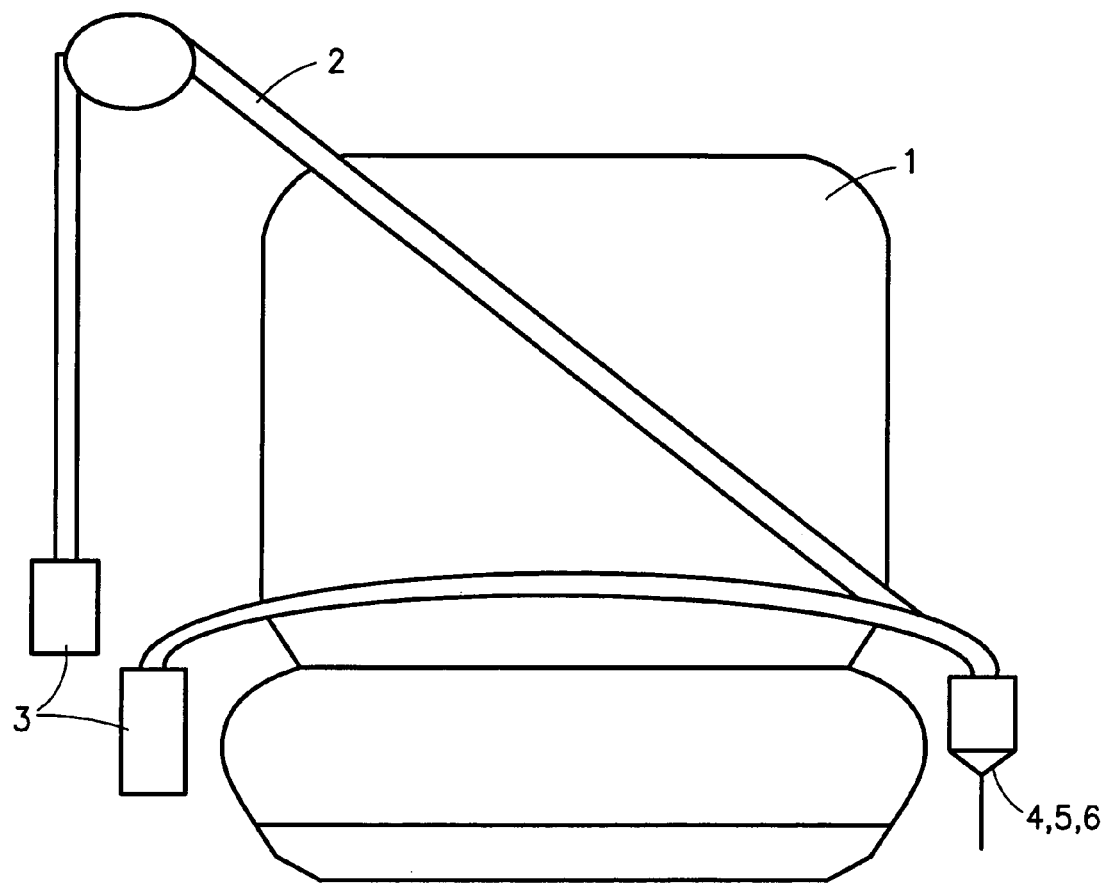

The FIGURE shows a vehicle seat 1 and the associated safety belt 2 with belt-mount fixtures 3 and a belt buckle 4, as they may be disposed in a motor vehicle.

In the exemplary embodiment described here, vehicle seat 1 is provided with a sensor mat, however, other means for weight determination may be provided. To supplement the data regarding the seat occupancy acquired with the aid of the sensor mat, a belt-force sensor 5 is provided, which may be integrated in belt buckle 4. However, the belt-force sensor may also be laterally arranged on the belt buckle, for example, between the belt buckle and its anchoring in the vehicle.

In addition, belt buckle 4 is provided with a belt-buckle contact 6, via which the respective belt-buckle state is ascertained, i.e., whether the belt buckle is open or closed. Since belt-force sensor 5 is in an unloaded state when belt buckle 4 is open, this state may be reliably detected with the aid of belt-buckle contact 6.

The signal from belt-buckle contact 6, together with the signal from belt-force sensor 5, is conveyed to a control device, which may be arranged in vehicle seat 1. The two signals are then evaluated within the framework of a passenger classification.

At certain time intervals, synchronized with belt-force sensor 5, the belt-force sensor is calibrated in order to counteract age-related falsification of the measured value, for example, by a temporally variable offset of the sensor characteristic curve. For this purpose, the measured value of belt-force sensor 5 is set to zero when belt-force sensor 5 is in the unloaded state, that is, when belt buckle 4 is open.

Should this calibration procedure be interrupted by closing of belt buckle 4, the calibration procedure may be repeated as soon as possible. The time interval between the individual calibration procedures may therefore be selected to be shorter than absolutely necessary.

The calibration of the belt-force sensor will not necessarily have to take place in the unloaded state, by setting the zero value. The belt-force sensor is in any defined state during the calibration, so that the measured value corresponding to this defined state may be set. A prerequisite for this may be an arrangement for detecting such a defined state. This may be realized in a form other than that of a belt-buckle contact.

What is claimed is:

1. A device for calibrating a belt-force sensor, comprising:
    a detecting arrangement to detect an unloaded state of a belt-force sensor, the detecting arrangement including an arrangement for detecting a belt-buckle state; and
    an arrangement to set a measured value of the belt-force sensor to zero when the belt-force sensor is in the unloaded state in order to calibrate the belt-force sensor.

2. The device of claim 1, wherein the arrangement for detecting the belt-buckle state includes at least one belt-buckle contact.

3. A method for calibrating a belt-force sensor, comprising:
    ascertaining a state of a belt buckle;
    detecting, based on the state of the belt buckle, when the belt-force sensor is in an unloaded state; and
    setting a measured value of the belt-force sensor to zero when the belt-force sensor is the unloaded state in order to calibrate the belt-force sensor.

4. The method of claim 3, wherein the state of the belt buckle is ascertained with the aid of a belt-buckle contact.

5. The method of claim 3, wherein the sensor is repeatedly calibrated at a regular time interval.

* * * * *